(12) United States Patent
Trenchev et al.

(10) Patent No.: US 12,546,343 B2
(45) Date of Patent: Feb. 10, 2026

(54) VORTEX CHAMBER

(71) Applicant: Universiteit Antwerpen, Antwerp (BE)

(72) Inventors: Georgi Trenchev, Antwerp (BE); Annemie Bogaerts, Wommelgem (BE)

(73) Assignee: Universiteit Antwerpen, Antwerp (BE)

( * ) Notice: Subject to any disclaimer, the term of this patent is extended or adjusted under 35 U.S.C. 154(b) by 457 days.

(21) Appl. No.: 18/037,453

(22) PCT Filed: Nov. 17, 2021

(86) PCT No.: PCT/EP2021/082041
§ 371 (c)(1),
(2) Date: May 17, 2023

(87) PCT Pub. No.: WO2022/106494
PCT Pub. Date: May 27, 2022

(65) Prior Publication Data
US 2023/0417264 A1  Dec. 28, 2023

(30) Foreign Application Priority Data
Nov. 23, 2020 (EP) .................................. 20209213

(51) Int. Cl.
*F15D 1/00* (2006.01)
(52) U.S. Cl.
CPC ................... *F15D 1/0015* (2013.01)
(58) Field of Classification Search
CPC .......... F15D 1/0005; F15D 1/02; F16K 17/34; Y10T 137/7784; Y10T 137/2115;
(Continued)

(56) References Cited

U.S. PATENT DOCUMENTS 3,958,413 A     5/1976 Cornelius et al.
5,303,782 A *  4/1994 Johannessen ............ G05D 7/01
                                                         137/809
(Continued)

FOREIGN PATENT DOCUMENTS

EP     2886955 A1   6/2015
EP     3062019 A1   8/2016
(Continued)

OTHER PUBLICATIONS

Trenchev et al., CO2 Conversion in a Gliding Arc Plasmatron: Multidimensional Modeling for Improved Efficiency, J. Phys. Chem. C, 2017, 24470-24479, 121.

(Continued)

*Primary Examiner* — Bryan M Lettman
(74) *Attorney, Agent, or Firm* — Hodgson Russ LLP

(57) ABSTRACT

The present disclosure relates to a vortex chamber comprising a cavity elongating along a central axis and a swirl generator. The swirl generator comprises a plurality of swirl channels configured for introducing a gas flow into the cavity as a vortex flow about the central axis, each swirl channel comprising a channel entrance and a channel exit. The swirl generator further comprises a gas redistribution chamber comprising one or more main gas supply inlets for receiving a gas, a distribution channel configured for distributing the gas received from the one or more main gas supply inlets to the channel entrances of the swirl channels, and one or more blocking walls configured for blocking and unblocking one or more entrances of the plurality of swirl channels. The vortex chamber is further configured for relatively rotating the channel entrances of the swirl channels with respect to the one or more blocking walls from a first angular position to at least a second angular position and vice versa, and wherein when in the second angular position (Continued)

Figure 1:
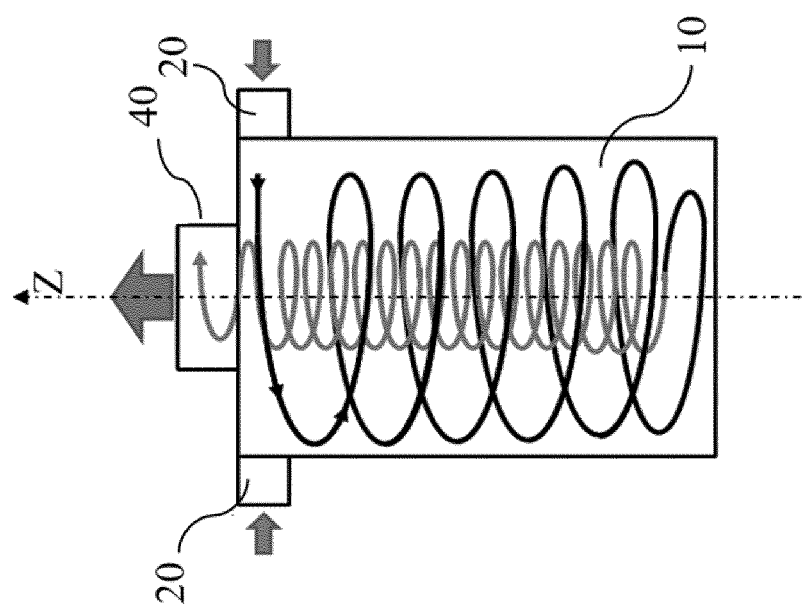

the one or more blocking walls block a larger number of channel entrances than when in the first angular position.

17 Claims, 11 Drawing Sheets

(58) Field of Classification Search
CPC ......... Y10T 137/2087; Y10T 137/2093; Y10T 137/2098; Y10T 137/2104; Y10T 137/2109
See application file for complete search history.

(56) References Cited

U.S. PATENT DOCUMENTS

| | | | | |
|---|---|---|---|---|
| 5,687,766 A | * | 11/1997 | Weakley | F15D 1/0015 137/810 |
| 2002/0069636 A1 | * | 6/2002 | Knuth | F23R 3/58 60/205 |
| 2005/0173009 A1 | * | 8/2005 | Bowe | F16K 3/24 137/808 |
| 2012/0103424 A1 | * | 5/2012 | Dupont | B63G 13/00 137/810 |
| 2017/0342860 A1 | * | 11/2017 | Morisawa | F23R 3/26 |

FOREIGN PATENT DOCUMENTS

| | | |
|---|---|---|
| GB | 2085147 A | 4/1982 |
| JP | H04148113 A | 5/1992 |

OTHER PUBLICATIONS

WIPO, International Search Report for PCT/EP2021/082041, Jan. 24, 2022.

* cited by examiner

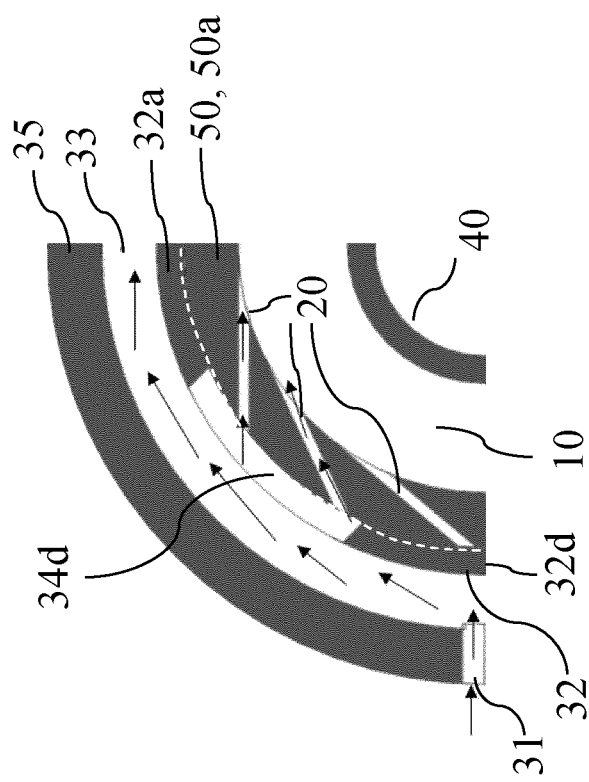

VORTEX CHAMBER

FIELD OF THE DISCLOSURE

The present disclosure relates to a vortex chamber comprising a cavity elongating along a central axis and a swirl generator. The swirl generator comprises a plurality of swirl channels configured for introducing a gas flow into the cavity as a vortex flow about the central axis.

BACKGROUND

Vortex chambers are used in various technical domains wherein a gas vortex flow within a cavity is required, such as for example in the domain of plasma reactors or in the domain of combustion devices.

An example of a plasma reactor making use of a vortex chamber is a gliding arc discharge reactor, as disclosed for example by Trenchev et al. in J. Phys. Chem. C 2017, 121, 24470-24479.

A vortex chamber comprises a swirl generator having one or more swirl channels configured for injecting the gas into the cavity of the vortex chamber. These swirl channels are generally tangential with respect to a cylindrical cavity. As a result, when gas is injected in the cavity through the swirl channels, the gas is swirling and follows a vortex gas flow path.

Depending on the geometry of the vortex chamber, the swirling path can result in a forward vortex or a reverse vortex flow path.

The vortex flow aims at stabilizing a central zone within the cavity. Due to the vortex flow mass flow takes place from the outer side of the cavity to the inner side. The vortex chambers are effective at for example stabilizing a swirling flame or a plasma discharge.

However, one of the problems with the vortex chambers is that to generate successfully a vortex flow, a specific velocity and pressure in the swirl inlets is required. As a result, the vortex chambers work in a limited range of flow rates. For instance, a flow rate that is too low might not form a vortex flow pattern, while a flow rate that is too high will cause too much pressure strain on the tangential inlets and potentially damage the vortex chamber.

For example, in a plasma reactor, if the flow rate is too low, a vortex flow might not be generated and the temperature of the plasma can increase and overheat the reactor.

A further problem is that the vortex flow pattern can change significantly over usable flow rates, influencing the combustion or plasma characteristics.

Hence there is room for improving vortex chambers for generating a vortex flow in a cavity.

SUMMARY

It is an object of the present disclosure to provide a robust vortex chamber with improved vortex flow controlling capacities when compared to the prior art vortex chambers. More specifically, it is an object to control the vortex flow pattern for different gas flow rates.

The present invention is defined in the appended independent claims. The dependent claims define advantageous embodiments.

According to a first aspect of the invention a vortex chamber comprising a cavity elongating along a central axis and a swirl generator is provided. The swirl generator comprises a plurality of swirl channels configured for introducing a gas flow into the cavity as a vortex flow about the central axis and each swirl channel comprising a channel entrance and a channel exit. The vortex chamber is characterized in that the swirl generator further comprises a gas redistribution chamber comprising i) one or more main gas supply inlets for receiving a gas, ii) a distribution channel configured for distributing the gas received from the one or more main gas supply inlets to the channel entrances of the swirl channels, and iii) one or more blocking walls configured for blocking and unblocking one or more entrances of the plurality of swirl channels. The vortex chamber is further configured for relatively rotating the channel entrances with respect to the one or more blocking walls from a first angular position to at least a second angular position and vice versa, and wherein when in the second angular position the one or more blocking walls block a larger number of channel entrances than when in the first angular position.

Advantageously, by providing a one or more blocking walls for blocking and unblocking one or more entrances of the plurality of swirl channels, when increasing for example a gas flow rate at the main gas supply inlet, the velocity of the gas in the swirl channels can be kept constant by opening more entrance channels. In this way, the flow rate of the gas can be increased without causing pressure strain in the swirl channels.

Advantageously, with the one or more blocking walls, the vortex chamber can operate in a broader range of gas flow rates while controlling the gas velocity and hence the vortex flow pattern.

Advantageously, a combustion or plasma reactor that utilizes a vortex chamber according to the present disclosure becomes capable of sustaining wider ranges of power, flow rate, pressure and gas mixtures.

In embodiments, the swirl generator is configured for generating a forward vortex flow while in other embodiments, the swirl generator is configured for generating a reversed vortex flow.

In embodiments, each of the swirl channels is traversing a cavity peripheral wall from the channel entrance at an outer side of the cavity peripheral wall to the channel exit at an inner side of the cavity peripheral wall. The cavity peripheral wall is elongating along the central axis and radially delimits the cavity.

Preferably, in embodiments with swirl channels traversing the cavity peripheral wall, the vortex chamber is configured for relatively rotating the cavity peripheral wall or for relatively rotating at least a portion of the cavity peripheral wall comprising the plurality of swirl channels with respect to the one or more blocking walls for performing the rotation from the first to the second angular position and vice versa.

In embodiments, the blocking walls are formed by wall portions of a circumferential side of the gas redistribution chamber.

In further embodiments, each of the swirl channels is traversing a cavity axial wall from the channel entrance at an outer side of the cavity axial wall to the channel exit at an inner side of the cavity axial wall. The cavity axial wall is axially delimiting the cavity.

Preferably, in embodiments with swirl channels traversing the cavity axial wall, the vortex chamber is configured for relatively rotating the cavity axial wall, or at least a portion of the cavity axial wall comprising the swirl channels, with respect to the one or more blocking walls for performing the rotation from the first to the second angular position and vice versa.

In embodiments, the blocking walls are formed by wall portions of an axial side of the gas redistribution chamber.

According to a further aspect of the disclosure a plasma reactor or a combustion device comprising a vortex chamber as presently disclosed is provided.

SHORT DESCRIPTION OF THE DRAWINGS

Figure 3:
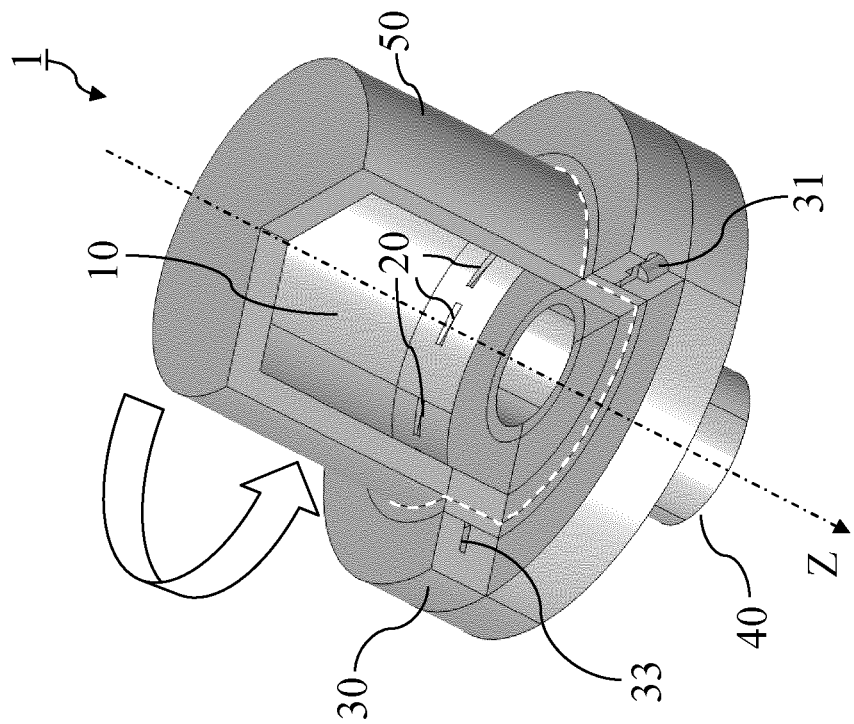
Figure 2:
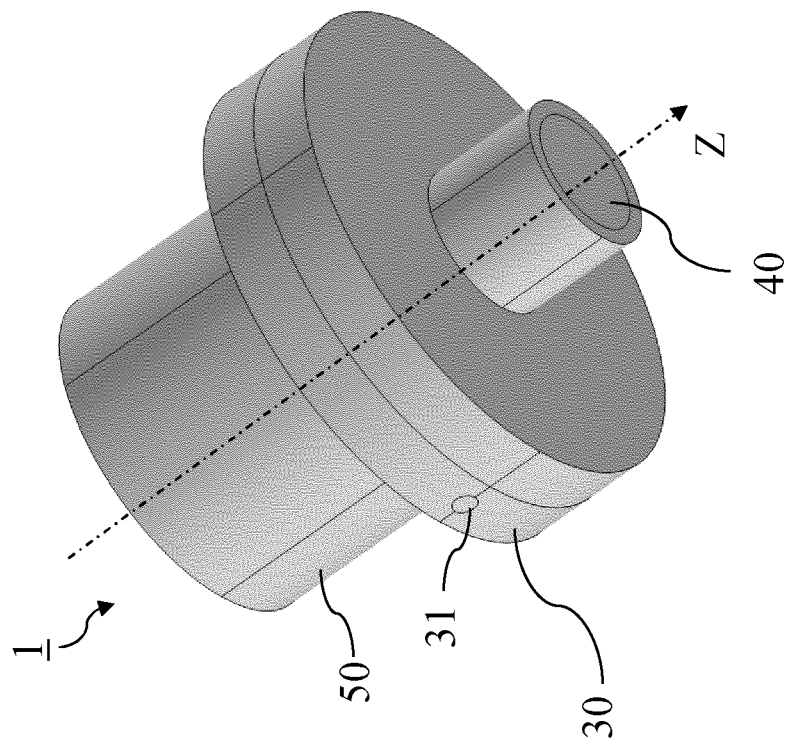
Figure 4A:
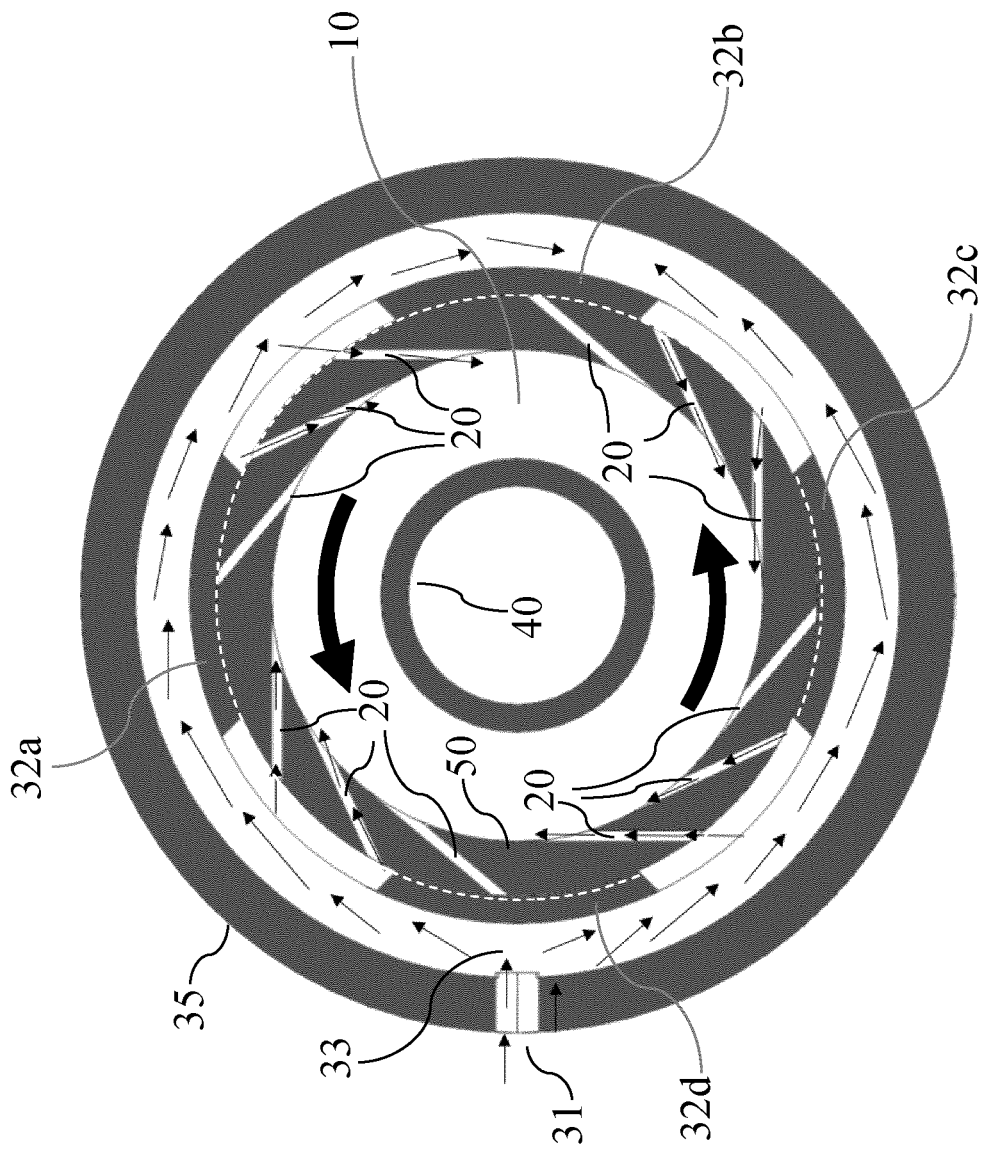
Figure 4B:
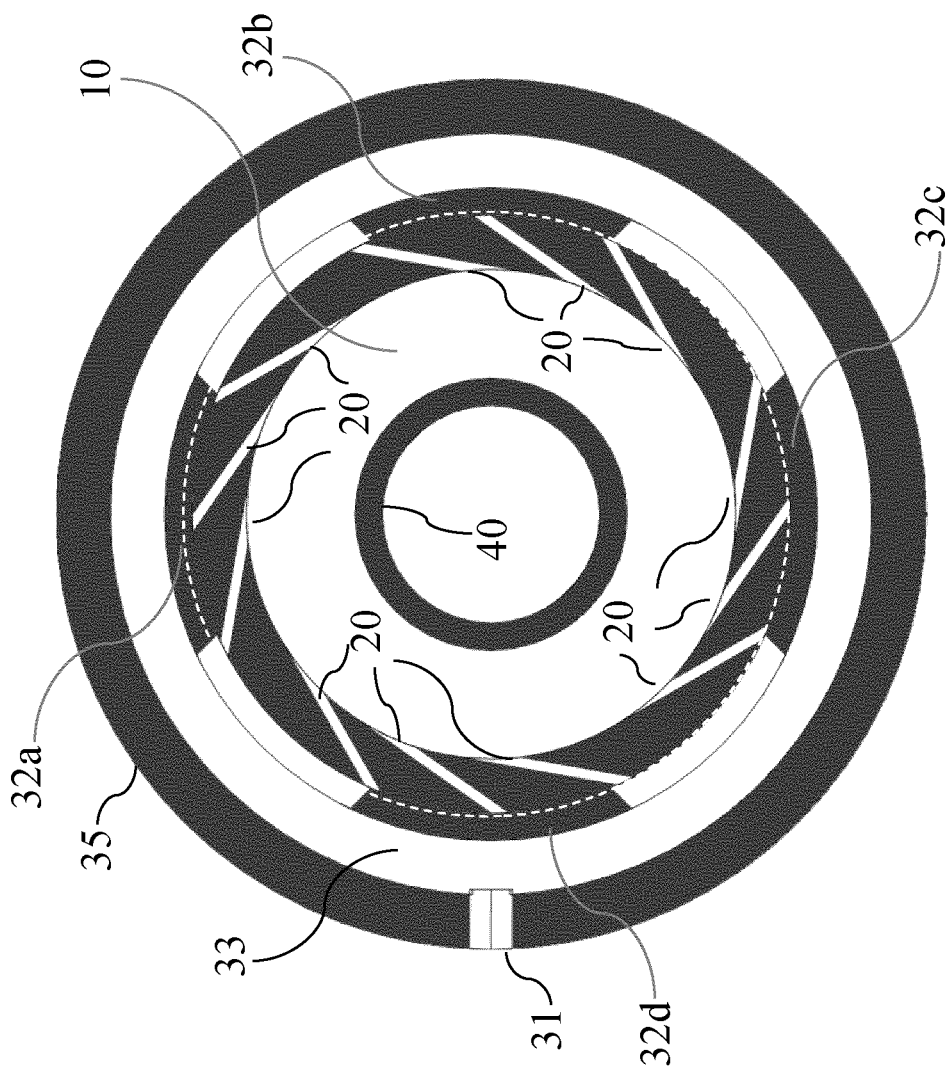
Figure 6:
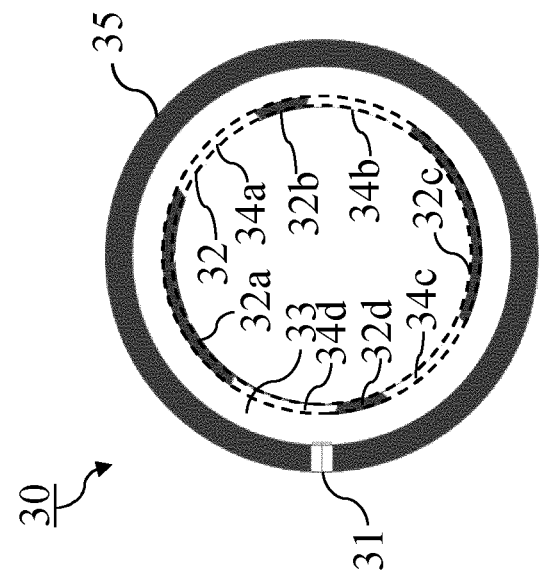
Figure 5:
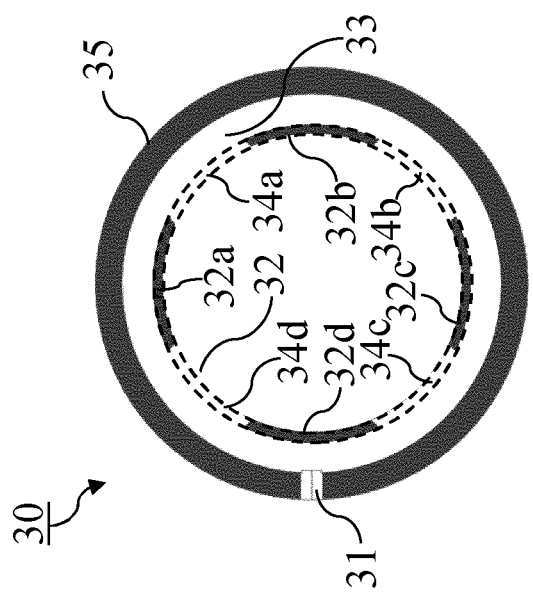
Figure 7:
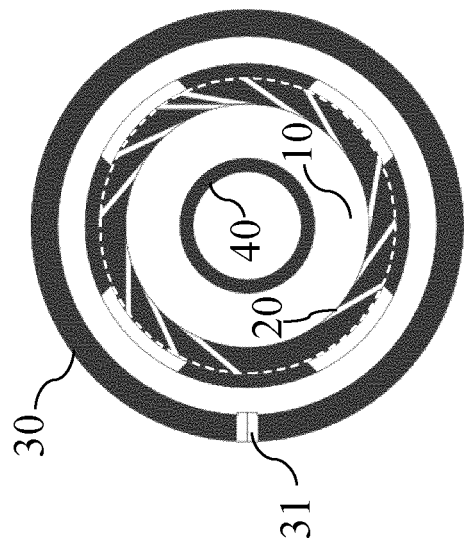
Figure 8:
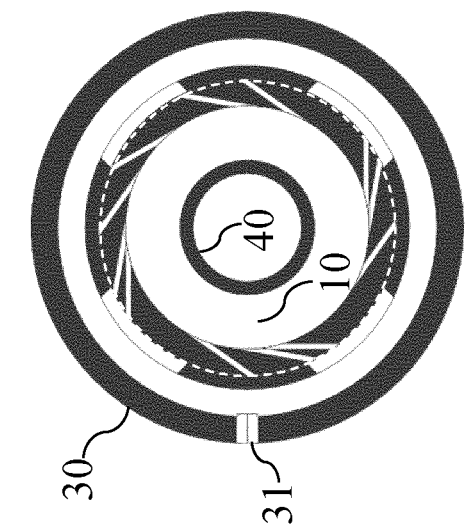
Figure 9:
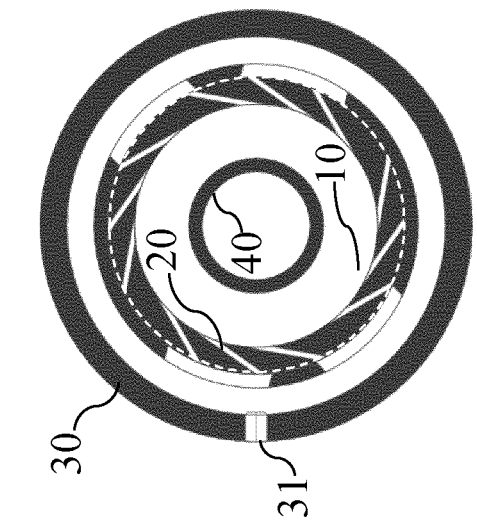
Figure 11A:
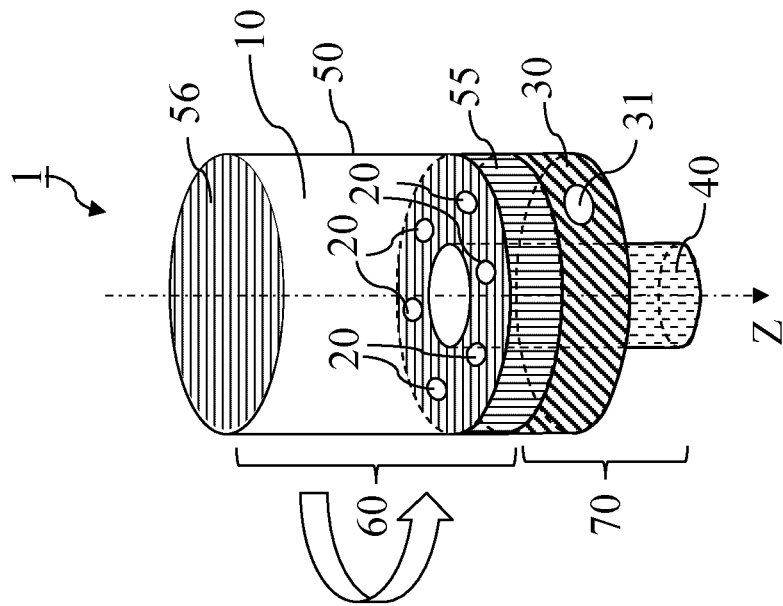
Figure 10:
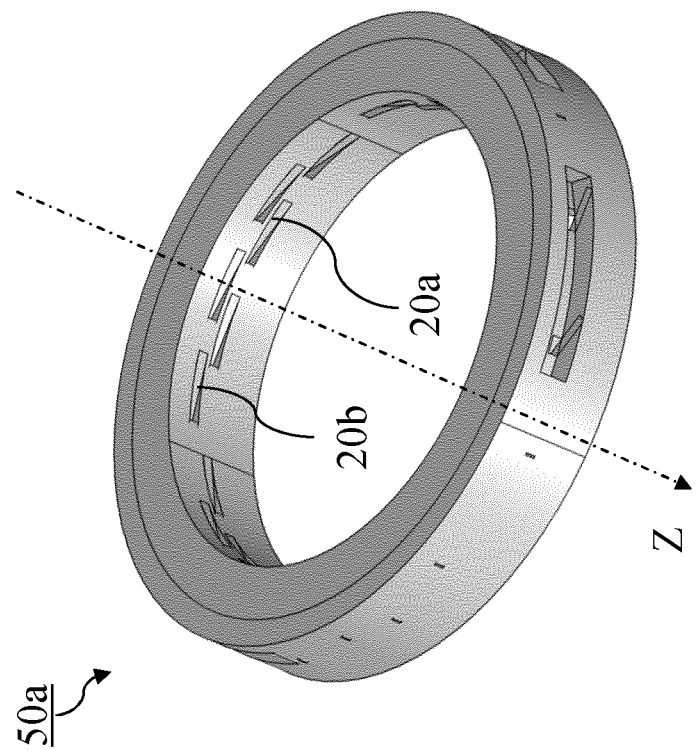
Figure 11B:
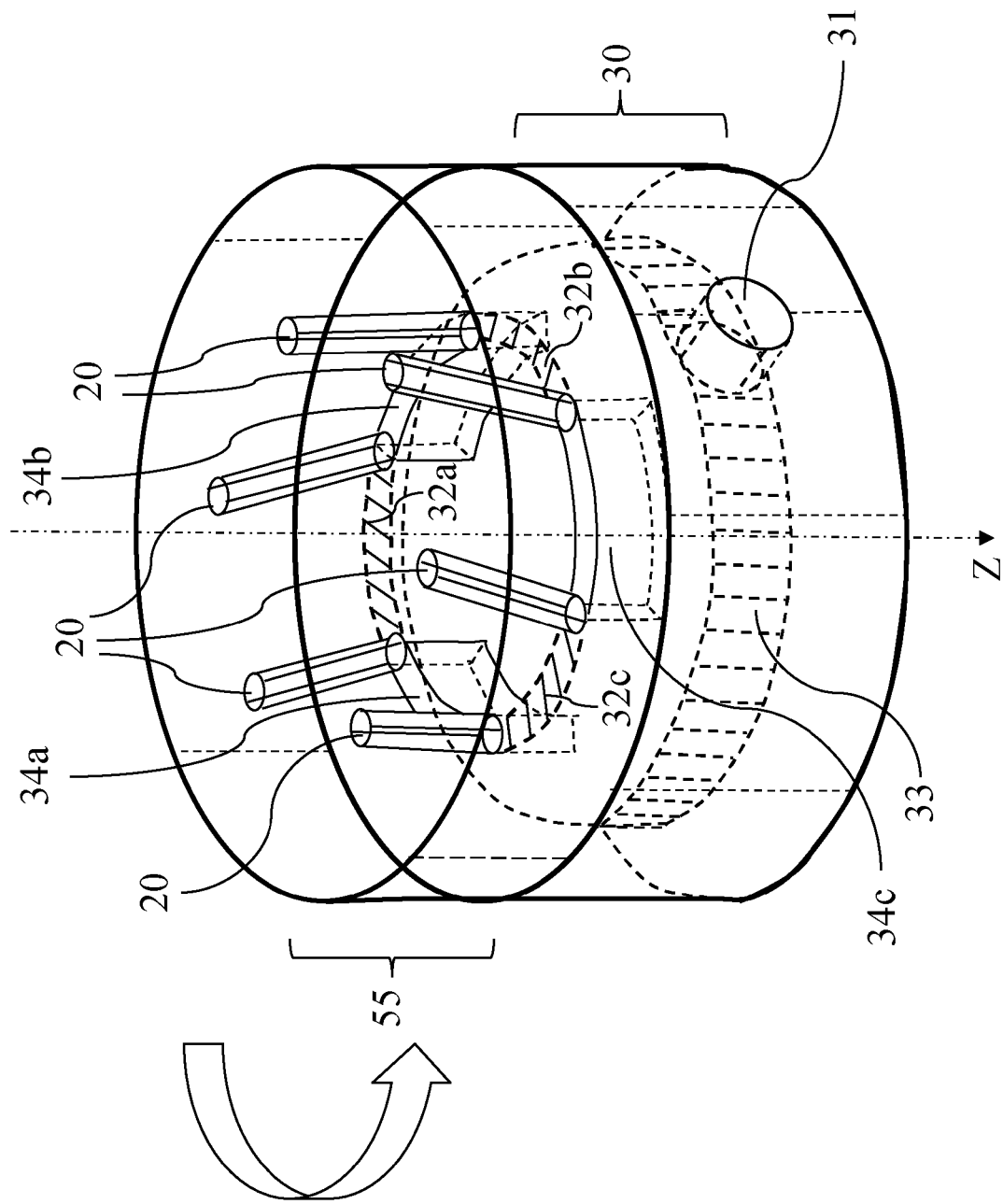
Figure 12:
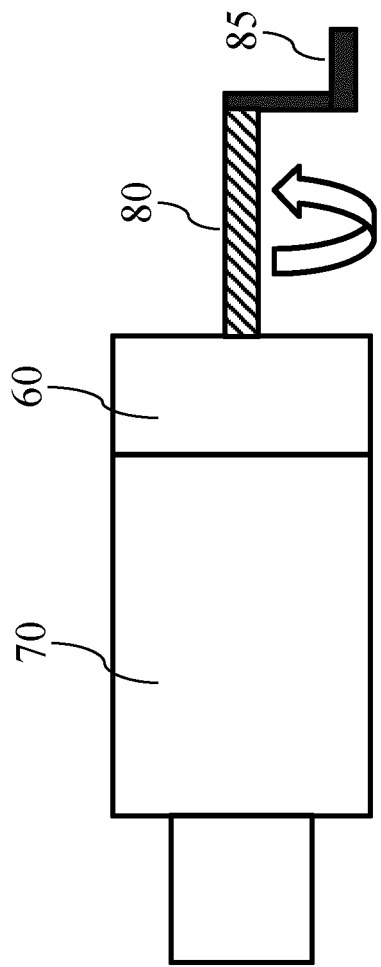
Figure 13:
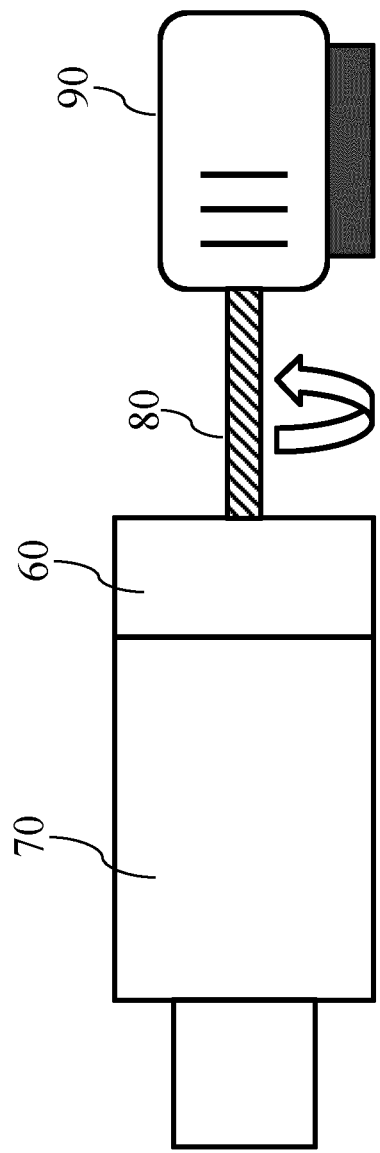
Figure 14:
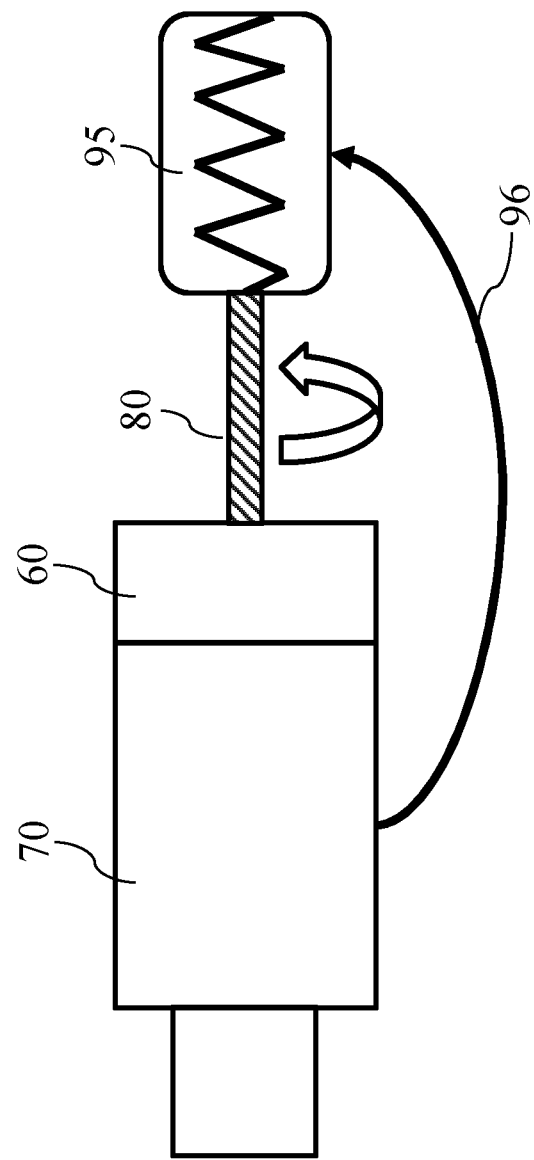

These and further aspects of the present disclosure will be explained in greater detail by way of example and with reference to the accompanying drawings in which:

FIG. 1 schematically illustrates a vortex flow in a cavity of a vortex chamber,

FIG. 2 shows an isometric view of an example of an embodiment of a vortex chamber according to the present disclosure, FIG. 3 is a cut-out view of the vortex chamber shown in FIG. 2, FIG. 4a shows a cross-section of the vortex chamber of FIG. 2 taken through a plane perpendicular with the central axis, and wherein the swirl channels are located in a first angular position with respect to the blocking walls, FIG. 4b shows a cross-section of the vortex chamber of FIG. 2 taken through a plane perpendicular with the central axis, and wherein the swirl channels are located in a second angular position with respect to the blocking walls, FIG. 4c is an enlarged view of FIG. 4a, FIG. 5 shows a cross-section of the redistribution chamber of the vortex chamber shown in FIG. 2, FIG. 6 shows a cross-section of a further example of a redistribution chamber, FIG. 7 shows a cross-section of an embodiment of a vortex chamber wherein the swirl channels are asymmetrically positioned, FIG. 8 shows a cross-section of a further example of an embodiment of a vortex chamber wherein the swirl channels are asymmetrically positioned, FIG. 9 shows a cross-section of an example of an embodiment of a vortex chamber wherein blocking walls have different angular widths, FIG. 10 illustrates a portion of an embodiment of a swirl generator wherein the channel exits are both radially and axially distributed on a cavity peripheral wall, FIG. 11a schematically shows an isometric view of a vortex chamber wherein the swirl channels are traversing an axial wall of the cavity, FIG. 11b schematically illustrates a more detailed representation of the swirl generator of FIG. 11a, FIG. 12 schematically illustrates an embodiment wherein the swirl channels are rotatable with a lever, FIG. 13 schematically illustrates an embodiment wherein the swirl channels are rotatable with a motor, FIG. 14 schematically illustrates an embodiment of a plasma reactor wherein the rotation of the swirl channels are controlled through a thermal coupling with a peripheral wall of the reactor.

The drawings of the figures are neither drawn to scale nor proportioned. Generally, identical components are denoted by the same reference numerals in the figures.

DETAILED DESCRIPTION OF EMBODIMENTS

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

Vortex Chamber, General

A gas vortex flow has to be construed as a gas flow swirling around an axis line. In a vortex chamber, the gas injected through swirl channels swirls around a central axis of the cavity. In FIG. 1, an example of a known vortex chamber is shown wherein gas is injected in a cavity 10 through swirl channels 20 resulting in a vortex flow around the central axis Z of the cavity. The gas exits the cavity through the gas outlet 40. Is this example the vortex flow is a reversed vortex flow. The present disclosure is however not limited to any specific vortex flow generated in the vortex chamber. Depending on the geometry of the vortex chamber, in some embodiments a forward vortex is generated in the cavity while in other embodiments a reversed vortex flow is generated in the cavity. The vortex chamber according to the present disclosure is also not limited to a specific gas to be used. The gas, or the gas mixture to be used, depends on the application the vortex chamber is used for, as will be further discussed below.

The vortex chamber according to the present disclosure is a vortex chamber having an adjustable swirl generator, i.e. a swirl generator that allows to adjust the number of operational swirl channels.

An isometric view of an embodiment of a vortex chamber 1 according to the present disclosure is shown in FIG. 2. To better illustrate this embodiment, FIG. 3 shows a cut-out view of the vortex chamber shown in FIG. 2. The vortex chamber 1 comprises a cavity 10 elongating along a central axis Z and a swirl generator. The swirl generator comprises a plurality of swirl channels 20 configured for introducing a gas flow into the cavity 10 as a vortex flow about the central axis Z. Each swirl channel comprising a channel entrance for receiving gas and a channel exit for injecting the gas into the cavity.

A swirl channel is to be construed as a channel configured for introducing the gas into the cavity in a given direction and that results in the formation of a vortex gas flow within the cavity.

A cross-sectional view of the vortex chamber of FIG. 2 taken through a plane perpendicular with the central axis is shown in FIG. 4a illustrating the location of the swirl channels 20. In this embodiment, the swirl generator comprises twelve swirl channels 20. The number of swirl channels can vary from embodiment to embodiment and is typically comprised between two and two hundred swirl channels.

The vortex chamber according to the present disclosure is characterized in that the swirl generator comprises a gas redistribution chamber 30. In FIG. 5, an example of a gas redistribution chamber 30 is shown, without any other components of the vortex chamber. The gas redistribution chamber 30 comprises one or more main gas supply inlets 31 for receiving a gas, a distribution channel 33 configured for distributing the gas received from the one or more main gas supply inlets to the channel entrances of the swirl channels, and one or more blocking walls 32a, 32b, 32c, 32d configured for blocking and unblocking one or more entrances of the plurality of swirl channels.

Blocking and unblocking of an entrance channel of a swirl channel has to be construed as respectively enabling and disabling a gas flow through the swirl channel.

In the embodiment shown in FIG. 5, the gas redistribution chamber 30 comprises four blocking walls 32a, 32b, 32c, 32d. The number of blocking walls can vary depending on the geometry of the gas redistribution chamber and depending on the number of swirl channels. Generally, there is at least one blocking wall, but the number of blocking walls can also be as large as one hundred.

With reference to FIG. 4a and FIG. 4c, the gas flow in the gas redistribution chamber is explained. FIG. 4c is an enlarged view of FIG. 4a, showing a quarter of the cross-sectional view of FIG. 4a. The subsequent arrows indicate the path of the gas flow. The gas enters the gas distribution chamber via the main gas supply inlet 31 and then the gas is distributed through the distribution channel 33 to the channel entrances of the swirl channels 20. Generally openings are provided in a wall portion of the gas redistribution chamber to fluidly connect the distribution channel 33 with entrances of swirl channels. The gas further flows through the swirl channels 20 and enters the cavity 10 as a vortex gas flow.

The vortex chamber according to the present disclosure is further characterized in that the vortex chamber is configured for relatively rotating the entrances of the swirl channels with respect to the one or more blocking walls 32a, 32b, 32c, 32d. The rotation can be performed from a first angular position to at least a second angular position and vice versa, and wherein when in the second angular position the one or more blocking walls blocks a larger number of channel entrances than when in the first angular position. In this way, the number of operational swirl channels for injecting gas in the cavity can be adjusted.

As a result of the relative rotation of the swirl entrances with respect to the blocking walls, the vortex chamber according to the present disclosure comprises a stationary part and a rotatable part. What part is stationary and what part is rotatable can vary and different embodiments are discussed below.

In embodiments the first angular position is a position wherein no channel entrances of the plurality of swirl channels are blocked and the second angular position is position wherein a portion of the channel entrances of the plurality of swirl channels are blocked.

In embodiments, the vortex chamber is configured for relatively rotating the channel entrances with respect to the blocking walls to a plurality of angular positions. In other embodiments, the rotation can be performed continuously over a given angular range and hence the channel entrances can be positioned with respect to the blocking walls in an infinite number of rotational positions. In embodiments, the rotation can be performed continuously from 0° to 360°.

The present disclosure is not limited to a specific number of swirl channels or specific number of blocking walls. Generally, #C≥2×#B, with #C and #B being respectively the number of swirl channels and the number of blocking walls, preferably 2≤#C≤200 and 1≤#B 100, more preferably 4≤#C≤200 and 2≤#B≤100.

In embodiments, the plurality of swirl channels are grouped into groups of swirl channels wherein #B=#G, with #B and #G being respectively the number of blocking walls and the number of groups. Each group comprises two or more swirl channels. For example the embodiment shown on FIG. 4a comprises four groups of swirl channels and four blocking walls. In this example each group of swirl channels comprises three swirl channels.

In some embodiments wherein the swirl channels are grouped into groups, each blocking wall is associated to one of the groups and each blocking wall is configured for blocking and unblocking entrances of swirl channels of the group of swirl channels the blocking wall is associated with. For the embodiment shown on FIG. 4a and FIG. 4b, for each blocking wall, a group of three swirl channels is associated. When in the first rotational position, shown in FIG. 4a, each of the four blocking walls is blocking one channel entrance. When in the rotational second position shown in FIG. 4b, in this example after a 30° rotation, each of the four blocking walls is blocking two channel entrances.

In embodiments, for example in embodiments wherein the vortex chamber is part of a plasma reactor, the vortex chamber further comprises electrodes or the peripheral wall or part of the peripheral wall forms an electrode.

Vortex Chambers With Radially Distributed Channel Exits

In embodiments, as illustrated on FIG. 3, the cavity 10 is radially delimited by a cavity peripheral wall and each swirl channel is traversing the cavity peripheral wall from the channel entrance at an outer side of the cavity peripheral wall to the channel exit at an inner side of the cavity peripheral wall.

In other words, in these embodiments, the channel exits of the swirl channels are radially distributed on an inner radial side of the cavity. This is further illustrated on FIG. 4a, which is a cross-section of the embodiment of FIG. 3, where twelve swirl channels 20 are shown having, in this example, both channel entrances and channel exits that are radially distributed.

In the embodiment shown on FIG. 3, the vortex chamber is configured for relatively rotating the cavity peripheral wall or relatively rotating at least a portion of the cavity peripheral wall comprising the plurality of swirl channels with respect to the one or more blocking walls for performing the rotation from the first to the second angular position and vice versa. The arrow on FIG. 3 and the two larger arrows on FIG. 4a illustrate the rotational direction of the cavity peripheral wall 50 for rotating for example from the first to the second position.

The dashed circle on FIG. 4a and the dashed line on FIG. 3 schematically show the interface between a rotatable and a stationary part, in this example the rotatable part being the cavity peripheral wall or at least a portion of the cavity peripheral wall comprising the swirl channels and the stationary part being the gas redistribution chamber comprising the blocking walls. Hence the rotatable part and the stationary part can differ from one embodiment to the other.

In embodiments, between the rotatable part and the stationary part a mechanical seal is placed in order to obtain an airtight rotational interface. In other embodiments, a lubricating fluid is located between the rotatable part and the stationary part. In further embodiments an airtight bearing can be used as an interface element between the rotating and the stationary part. In some embodiments, a low leakage can be acceptable if the amount of leakage is much lower when compared to the overall gas flow rate through the swirl channels.

In FIG. 4b, the cavity peripheral wall comprising the swirl channels is rotated by 30° with respect to the blocking walls 32a, 32b, 32c, 32d when compared to FIG. 4a. By rotating from the first angular position, shown in FIG. 4a, to the second angular position, shown in FIG. 4b, in this example following a rotation of 30°, the number of operational channels, i.e. the number of channels that inject gas into the cavity 10 is reduced from eight to four open channels.

The reduction of the number of operational channels has an impact on the vortex pattern and especially on the velocity of the gas flow. For example when comparing the velocity of the gas flow inside the swirl channels when in the position shown in FIG. 4a with the position shown in FIG. 4b, for the same gas flow rate, the velocity increases in this example from 90 m/s to 140 m/s. This has the advantage that the gas flow rate can be adjusted over time while keeping the same or a similar gas flow velocity. A vortex flow can for example initially be created with a lower gas flow rate and then increased afterwards.

In some embodiments, as illustrated on FIG. 3 and FIG. 4a, the channel exits of all the swirl channels are axially, i.e. with respect to the central axis Z, located in the same axial position. In other embodiments, as illustrated on FIG. 10, a first portion 20a of the swirl channels have radially distributed channel exits that are located at a first axial position and a second portion 20b of the swirl channels have radially distributed channel exits that are located at a second axial position. In these embodiments, the blocking walls are configured for blocking the channel entrances of both the first and second portion of swirl channels.

In embodiments, the cavity peripheral wall is made of or partly made of a metal, such as for example stainless steel. Examples of embodiments wherein the cavity peripheral wall comprises different parts made of different materials will be discussed below.

In some embodiments, a portion of the cavity is cylindrical and the swirl channels are tangential with respect to the cylindrical portion. In other embodiments, the swirl channels are not tangential.

In the embodiment shown on FIG. 4a and FIG. 4b, the blocking walls are placed symmetrically, i.e. the blocking walls have the same angular width, and also the swirl channels are placed symmetrically, i.e. within each of the four groups of swirl channels the relative positions of the swirl channels is the same for each group of swirl channels. Hence, when rotating the channel entrance faces for example from the first to the second angular position, the number of swirl channels within a group that are blocked by an associated blocking wall is the same for each group of swirl channels. For example, in FIG. 4a, each blocking wall blocks one swirl channel and after a 30° rotation, shown in FIG. 4b, each blocking wall blocks two swirl channels.

In other embodiments, as illustrated on FIG. 7 and FIG. 8, the four blocking walls are placed symmetrically, as in FIG. 4a, but the swirl channels are placed asymmetrically, i.e. within each of the four groups of swirl channels the relative positions of the swirl channels differ from group to group. Hence, the number of swirl channels blocked by a blocking wall are not the same for each blocking wall. As illustrated on FIG. 7 and FIG. 8, one blocking wall is for example blocking two swirl channels while another blocking wall is only blocking one swirl channel.

Embodiments with a Two-Part Cavity Peripheral Wall

In some embodiments the cavity peripheral wall 50 comprises a first part 50a and a second part 50b, radially delimiting respectively a first cavity portion and a second cavity portion. The first cavity portion is the portion of the cavity where the gas is injected for starting a vortex flow. Hence, in these embodiments, the swirl channels are comprised within the first part 50a of the cavity peripheral walls. In other words, in these embodiments, the swirl channels are traversing the first part 50a from the channel entrance at an outer side of the first part 50a to the channel exit at an inner side of the first part 50a. An example of a first part 50a of the cavity peripheral wall, that is separated from the second part, is shown in FIG. 10.

In embodiments, the wall thickness of the first part 50a comprising the swirl channels is thicker than the wall thickness of the second part 50b. In this way the wall thickness of the first part 50a can be adapted according to the length of the swirl channels and the wall thickness of the second part 50b can be reduced.

In embodiments, the first part 50a comprising the swirl channels can be rotated with respect to the second part 50b. In this way, for performing the rotation from the first to the second angular position, the second part 50b can for example remain stationary. Hence in this way, for performing the rotation it is not necessary to rotate the entire cavity peripheral wall delimiting the cavity.

In some embodiments, the first part 50a is made of a material that is different from the first part 50b. For example, the first part 50a comprising the swirl channels is made of stainless steel and the second part 50b is made of quartz.

In embodiments the cavity peripheral wall 50 comprises a first part 50a and a second part 50b wherein the second part is electrically insulated from the first part by an insulator such as for example a ceramic insulator. In embodiments the cavity peripheral wall or the first part of the cavity peripheral wall forms an electrode. In embodiments, the first part 50a and the second part 50b form respectively a first and a second electrode, electrically insulated from each other.

Gas Redistribution Chamber

As discussed above, the gas redistribution chamber serves to distribute the incoming gas received at the one or more main gas inlets towards the channel entrances of the swirl channels.

In embodiments, as illustrated on FIG. 5 and FIG. 6, the gas redistribution chamber 30 comprises a circumferential side 32, illustrated with two dashed circles. One or more wall portions of the circumferential side 32 of the gas redistribution chamber are forming the one or more blocking walls. In this example, shown on FIG. 5 and FIG. 6, there are four blocking walls 32a, 32b, 32c, and 32d.

The circumferential side 32 of the gas redistribution chamber comprises at least one wall opening for fluidly connecting the distribution channel 33 with channel entrances of the swirl channels. The number of openings depends on the number of blocking walls. Preferably, two or more openings are configured for supplying the gas to the entrances of the swirl channels.

In the embodiment shown on FIG. 5, there are four blocking walls 32a, 32b, 32c, and 32d separated by four openings 34a, 34b, 34c and 34d. In other words, the one or more wall portions forming the one or more blocking walls correspond to wall portions of the circumferential side of the gas redistribution chamber separating the two or more wall openings from each other.

As further illustrated on FIG. 4c, the circumferential side 32 of the gas redistribution chamber is encircling or partly encircling the outer side 50 of the cavity peripheral wall or encircling or partly encircling at least a portion 50a of the outer side of the cavity peripheral wall comprising the channel entrances of the plurality of swirl channels. In this way, by defining a relative rotation of the circumferential side with respect to the entrance channels, the wall portions of the circumferential side 32 forming the blocking walls can face the channel entrances channels and hence block the channel entrances.

In embodiments of a gas redistribution chamber, as shown in FIG. 5, the blocking walls are symmetrically distributed with respect to circumferential side 32 and each of the blocking walls is identical, i.e. they have for example the same angular width. In other embodiments as illustrated on FIG. 6, there are two blocking walls 32a and 32b having a different angular width when compared to blocking walls 32b and 32d. In FIG. 9, a cross-section of a vortex chamber is shown comprising the gas redistribution chamber of FIG. 6. Using blocking walls having different angular widths, increases the flexibility for rotating the channel entrances with respect to the blocking walls to an increased number of rotational positions for blocking more or less channel entrances.

In embodiments, the gas redistribution chamber 30 further comprises an outer wall 35 defining an outer periphery of the gas redistribution chamber and wherein the one or more main gas supply inlets traverse the outer wall 35 to supply the gas to the redistribution channel. As illustrated on FIG. 4c, the redistribution channel 33 is located between the circumferential side 32 and the outer wall 35 of the gas redistribution chamber.

The gas redistribution chamber is for example made of or partly made of metal, such as for example stainless steel.

Vortex Chambers With Axially Distributed Channel Exits

The swirl generator according to the present disclosure is not limited to swirl channels having channel exits located on a radial circumferential wall of the cavity. In embodiments, as illustrated on FIG. 11a, the cavity 10 of the vortex chamber 1 is radially delimited by a cavity peripheral wall 50 and axially delimited by at least a cavity axial wall 55 and wherein each swirl channel 20 is traversing the cavity axial wall 55 from the channel entrance at an outer side of the cavity axial wall to the channel exit at an inner side of the cavity axial wall. In other words, the thickness of the cavity axial wall 55 is adapted as function of the dimensions of the swirl channels.

The exemplary embodiment shown on FIG. 11a, comprises an axial cavity wall 55 having six swirl channels 20. In this embodiment, the cavity 10 has a cylindrical shape and a further cavity axial wall 56 located opposite the cavity axial wall 55 comprising the swirl channels is further axially delimiting the cavity.

For embodiments having a cavity axial wall 55 comprising the swirl channels, a gas redistribution chamber 30 is provided that comprises an axial side facing the outer side of the cavity axial wall 55. In these embodiments, one or more wall portions of the axial side of the gas redistribution chamber are forming the one or more blocking walls for blocking the axial entrances of the swirl channels.

In the embodiment shown on FIG. 11a, the vortex chamber 1 comprises a gas outlet 40 located on the cavity axial side that comprises the swirl channels. In other embodiments, the gas outlet 40 can be located in the cavity axial wall 56 opposite the cavity axial wall comprising the swirl channels.

The gas redistribution chamber 30 and the cavity axial wall of the embodiment of FIG. 11a are shown in more detail in FIG. 11b. As schematically illustrated FIG. 11b, the gas redistribution chamber 30 comprises at least one main gas supply inlet 31, in this example one gas supply inlet 31 is shown, and further comprises a redistribution channel 33 configured for transporting the gas from the one or more main gas supply inlets 31 to the channel entrances of the swirl channels. Therefore, the axial side of the gas redistribution chamber comprises at least one wall opening for fluidly connecting the redistribution channel 33 with the channel entrances of the swirl channels. In the embodiment shown on FIG. 11b, there are three wall openings 34a, 34b, 34c through the axial side of the gas redistribution chamber allowing to fluidly connect the gas redistribution channel 33 with the channel entrances of the swirl channels 20.

Preferably, the axial side of the gas redistribution chamber comprises two or more wall openings configured for supplying the gas to the entrances of the swirl channels. In these embodiments, the one or more wall portions forming the one or more blocking walls correspond to wall portions of the axial side of the gas redistribution chamber separating the two or more wall openings from each other.

In the embodiments having swirl channels located in a cavity axial wall, the vortex chamber 1 is configured for relatively rotating the cavity axial wall 55 with respect to the one or more blocking walls of the gas redistribution chamber 30 for performing the rotation from the first to the second angular position and vice versa. The arrow on FIG. 11a and FIG. 11b, indicates a rotational direction.

In FIG. 11a, the rotatable part 60 includes not only the cavity axial wall 55 but also the cavity peripheral wall 50 and the stationary part 70 corresponds in this example to the gas redistribution chamber 30. In other embodiments, the cavity axial wall 55 is rotatable and forms the rotational part, while the cavity peripheral wall 50 remains stationary and generally also the gas redistribution chamber remains stationary.

In some embodiments, not the entire cavity axial wall 55 is rotatable but only a portion of the axial cavity wall is rotatable, namely the portion of the cavity axial wall that is comprising the swirl channels.

In the embodiment shown on FIG. 11b the swirl channels are not exactly aligned with the central axis Z but the swirl channels have an inclination angle with respect to the central axis. This allows to generate a vortex flow pattern within the cavity.

In embodiments, between the rotatable part, i.e. the cavity axial wall 55 comprising the swirl channels, and the stationary part, i.e. the gas redistribution chamber 30, a mechanical seal is placed in order to obtain an airtight rotational interface. In other embodiments, a lubricating fluid is located between the cavity axial wall 55 comprising the swirl channels and the gas redistribution chamber 30 to obtain an airtight rotational interface. In further embodiments an airtight bearing can be used as an interface element between the rotating and the stationary part. In some embodiments, a low leakage can be acceptable if the amount of leakage is much lower when compared to the overall gas flow rate through the swirl channels.

Vortex Chamber, Automated Rotation

In embodiments, the relative rotation of the entrance channels with respect to the one or more blocking walls is performed manually, while in other embodiments the rotation is motorized.

In FIG. 12 an embodiment is schematically shown wherein a shaft 80 interconnects the rotatable part 60 with a lever 85 for manually rotating the rotatable part 60 with respect to the stationary part 70. On the other hand, in FIG. 13 an embodiment is schematically shown wherein a shaft 80 interconnects a rotatable part with a motor 90, for example a stepped motor.

Depending on the details of vortex chamber embodiments, as discussed above, the rotatable part can for example be the first part 51a of the cavity peripheral wall that comprises the swirl channels. In other embodiments, the rotatable part can be the entire cavity peripheral wall 50.

In FIG. 14, a further embodiment is schematically shown wherein a shaft 80 is coupled on one side with the rotatable part 60 and on the other side is coupled with a spring element 95. The spring element 95 is made of a heat-expansive material and a thermal connection 96 thermally couples the spring element with the cavity peripheral wall. In this way, if the walls of the cavity heat up, the spring element 95 will expand and this will result in a rotation of the shaft and hence a rotation of the rotating part. The thermal coupling of the spring with the cavity peripheral wall can for example be realized with gas vapour heat pipe, a liquid head transfer system or through direct thermal contact.

Plasma Reactors

According to a further aspect of the invention a plasma reactor is provided comprising a vortex chamber according to the present disclosure. The plasma reactor can be a vortex type or reverse vortex type plasma reactor.

Vortex and reverse-vortex reactors are effective at stabilizing a plasma discharge. However, they work in limited range of flow rates as the swirl channels require a specific flow velocity and pressure in order to successfully form a vortex or a reverse vortex flow. For instance, a flow rate that is too low might not form a vortex flow pattern, while a flow rate that is too high will cause too much pressure strain on the channel entrances. Moreover, the vortex flow pattern can change significantly over usable flow rates, influencing plasma characteristics. With the vortex chamber according to the present disclosure, the number of operational swirl channels can be adjusted during operation of the plasma reactor. In this way, plasma reactors comprising a vortex chamber according to the present disclosure become capable of sustaining wider ranges of power, flow rate, pressure and gas mixtures.

An example of an application wherein a plasma reactor is used is the process of recycling $CO_2$ gas. Such a recycling process involves splitting the $CO_2$ gas molecules into products such as CO and $O_2$.

In these embodiments, the gas that is transported via the gas distribution chamber to the swirl channels and injected in the cavity of the vortex chamber is $CO_2$. Within the cavity of the vortex chamber, a plasma is created and through interaction of the $CO_2$ gas molecules with the plasma the $CO_2$ gas molecules are dissociated and the resulting products such as CO and $O_2$ are extracted through the gas outlet of the vortex chamber. In other embodiments a gas mixtures is used, for example a mixture of $CO_2$ and $CH_4$.

The vortex chamber of the present disclosure can advantageously be used with for example a gliding arc discharge reactor.

As discussed above, in embodiments of vortex chambers for plasma reactors, the vortex chamber comprises one or more electrodes.

Other Applications

The use of the vortex chamber according to the present disclosure is however not limited to plasma reactors. The vortex chambers can also be used in the domain of for example combustion devices wherein the cavity of the vortex chamber is part of a combustion chamber. The advantages of using a vortex chamber according to the present disclosure that are applicable for the plasma reactor, as discussed above, are also applicable for a combustion chamber wherein gas is injected as a vortex flow.

REFERENCE NUMBERS

| | |
|---|---|
| 1 | Vortex chamber |
| 10 | cavity |
| 20, 20a, 20b | swirl channel |
| 30 | Gas redistribution chamber |
| 31 | Gas supply inlet |
| 32 | circumferential side of gas redistribution chamber |
| 32a, 32b, 32c, 32d | Blocking wall |
| 33 | Redistribution channel |
| 34a, 34b, 34c, 34d | Wall openings |
| 35 | Outer wall of redistribution chamber |
| 40 | Gas outlet |
| 50 | Cavity peripheral wall |
| 50a | First part of cavity peripheral wall |
| 50b | Second part of cavity peripheral wall |
| 55 | Cavity axial wall |
| 56 | Further axial cavity wall |
| 60 | Rotatable part |
| 70 | Stationary part |
| 80 | shaft |
| 85 | lever |
| 90 | motor |
| 95 | spring |
| 96 | thermal connection |

The invention claimed is:

1. A vortex chamber comprising a cavity elongating along a central axis and a swirl generator, said swirl generator comprising:
a plurality of swirl channels configured for introducing a gas flow into the cavity as a vortex flow about the central axis, each of the swirl channels comprising a channel entrance and a channel exit,
characterized in that:
said swirl generator further comprises:
a gas redistribution chamber comprising:
one or more main gas supply inlets for receiving a gas,
a distribution channel configured for distributing the gas received from said one or more main gas supply inlets to the channel entrances of said swirl channels, and
one or more blocking walls configured for blocking and unblocking one or more entrances of the plurality of swirl channels, and wherein the vortex chamber is configured for relatively rotating the channel entrances with respect to the one or more blocking walls from a first angular position to at least a second angular position and vice versa, and wherein when in said second angular position the one or more blocking walls block a larger number of channel entrances than when in said first angular position.

2. The vortex chamber according to claim 1, wherein the cavity is radially delimited by a cavity peripheral wall and wherein each swirl channel is traversing the cavity peripheral wall from the channel entrance at an outer side of the cavity peripheral wall to the channel exit at an inner side of the cavity peripheral wall, and wherein the vortex chamber is configured for relatively rotating the cavity peripheral wall or for relatively rotating at least a portion of the cavity peripheral wall comprising the plurality of swirl channels with respect to said one or more blocking walls for performing said rotation from the first angular position to the second angular position and vice versa.

3. The vortex chamber according to claim 2, wherein said gas redistribution chamber comprises a circumferential side encircling or partly encircling said outer side of the cavity peripheral wall or encircling or partly encircling at least a portion of the outer side of the cavity peripheral wall comprising the channel entrances of the plurality of swirl channels, and wherein one or more wall portions of said circumferential side of the gas redistribution chamber are forming said one or more blocking walls.

4. The vortex chamber according to claim 3, wherein said circumferential side of the gas redistribution chamber comprises two or more wall openings configured for supplying the gas to the entrances of the swirl channels, and
wherein said one or more wall portions forming the one or more blocking walls correspond to the wall portions of the circumferential side of the gas redistribution chamber separating the two or more wall openings from each other.

5. The vortex chamber according to claim 1, wherein at least a portion of the cavity is cylindrical and wherein said swirl channels are tangential with respect to said cylindrical portion.

6. The vortex chamber according to claim 1, wherein the cavity is axially delimited by a cavity axial wall and wherein each of the swirl channels is traversing the cavity axial wall from the channel entrance at an outer side of the cavity axial wall to the channel exit at an inner side of the cavity axial wall, and
wherein the vortex chamber is configured for relatively rotating the cavity axial wall, or at least a portion of the cavity axial wall comprising the swirl channels, with respect to said one or more blocking walls for performing said rotation from the first to the second angular position and vice versa.

7. The vortex chamber according to claim 6, wherein said gas redistribution chamber comprises an axial side facing said outer side of the cavity axial wall, and wherein one or more wall portions of said axial side of the gas redistribution chamber are forming said one or more blocking walls.

8. The vortex chamber according to claim 7, wherein said axial side of the gas redistribution chamber comprises two or more wall openings configured for supplying the gas to the entrances of the swirl channels, and wherein said one or more wall portions forming the one or more blocking walls correspond to the wall portions of the axial side of the gas redistribution chamber separating the two or more wall openings from each other.

9. The vortex chamber according to claim 1, wherein $\#C \geq 2 \times \#B$, with $\#C$ and $\#B$ being respectively a number of the swirl channels and a number of the blocking walls.

10. The vortex chamber according to claim 9, wherein said plurality of swirl channels are grouped into groups of said swirl channels wherein $\#B = \#G$, with $\#G$ being the number of groups, each group comprising two or more of said swirl channels.

11. The vortex chamber according to claim 9, wherein $2 \leq \#C \leq 200$ and $1 \leq \#B \leq 100$.

12. The vortex chamber according to claim 11, wherein $4 \leq \#C \leq 200$ and $2 \leq \#B \leq 100$.

13. The vortex chamber according to claim 1, wherein when in said first angular position no channel entrances of the plurality of swirl channels are blocked and when in said second angular position a portion of the channel entrances of the plurality of swirl channels are blocked.

14. The vortex chamber according to claim 1, further comprising a gas outlet, wherein the gas outlet is configured for outputting gas in a direction parallel with the central axis of the cavity.

15. The vortex chamber according to claim 1, wherein the rotation from the first angular position to the second angular position is automated.

16. The vortex type or reverse vortex type plasma reactor comprising the vortex chamber according to claim 1.

17. The combustion device comprising the vortex chamber according to claim 1.

* * * * *